(12) United States Patent
Veltri et al.

(10) Patent No.: US 9,977,657 B2
(45) Date of Patent: May 22, 2018

(54) APPLICATION DASHBOARD FOR WEBSITE DEVELOPMENT AND MANAGEMENT

(71) Applicant: WEEBLY, INC., San Francisco, CA (US)

(72) Inventors: Daniel W. Veltri, San Francisco, CA (US); Darian Shimy, Pleasanton, CA (US); Vitaly Odemchuk, San Francisco, CA (US); Jeffrey Scott Broderick, Fayetteville, NC (US)

(73) Assignee: WEEBLY, INC., San Francisco, CA (US)

( * ) Notice: Subject to any disclaimer, the term of this patent is extended or adjusted under 35 U.S.C. 154(b) by 0 days. days.

(21) Appl. No.: 15/279,329

(22) Filed: Sep. 28, 2016

(65) Prior Publication Data

US 2017/0090879 A1    Mar. 30, 2017

Related U.S. Application Data

(60) Provisional application No. 62/234,544, filed on Sep. 29, 2015.

(51) Int. Cl.
```
G06F 9/44       (2018.01)
G06F 3/0482     (2013.01)
G06F 3/0481     (2013.01)
G06F 3/0484     (2013.01)
G06Q 10/06      (2012.01)
```
(Continued)

(52) U.S. Cl.
CPC .............. *G06F 8/30* (2013.01); *G06F 3/0481* (2013.01); *G06F 3/0482* (2013.01); *G06F 3/0484* (2013.01); *G06F 9/4443* (2013.01); *G06F 9/451* (2018.02); *G06F 17/3089* (2013.01); *G06Q 10/063* (2013.01); *G06Q 30/02* (2013.01)

(58) Field of Classification Search
CPC ........................................................ G06F 8/30
USPC .................. 717/100–108, 120–122, 110–113
See application file for complete search history.

(56) References Cited

U.S. PATENT DOCUMENTS

| | | | | |
|---|---|---|---|---|
| 7,152,220 B2 * | 12/2006 | Rickards, III | ............ | G06F 8/71 717/101 |
| 7,240,323 B1 * | 7/2007 | Desai | ........................ | G06F 8/38 707/999.101 |

(Continued)

OTHER PUBLICATIONS

Tredue et al, "Awareness 2.0: Staying Aware of Projects, Developers and Tasks using Dashboards and Feeds", ACM, pp. 365-374, 2010.*

(Continued)

*Primary Examiner* — Anil Khatri
(74) *Attorney, Agent, or Firm* — Fenwick & West LLP

(57) ABSTRACT

A web editing server includes an app dashboard module that provides a dashboard user interface for presenting information provided by apps installed on users' websites. In one embodiment, the app dashboard module organizes the information as a series of cards, with each card providing information for an associated app. A user can select a card to obtain more information from the app. An app developer system allows an app developer to create and/or service an app in the app center. App developers may create cards by selecting one or more components from a card definition module. The app developer system may determine data attributes from received app data, which can be used to automatically create cards for the app dashboard.

14 Claims, 7 Drawing Sheets

(51) Int. Cl.
  *G06Q 30/02* (2012.01)
  *G06F 17/30* (2006.01)

(56) References Cited

U.S. PATENT DOCUMENTS

| | | | | |
|---|---|---|---|---|
| 7,747,959 B2* | 6/2010 | Keller | ............ | G06F 3/0481 |
| | | | | 709/206 |
| 7,809,858 B1* | 10/2010 | Brown | ............ | G06F 17/30887 |
| | | | | 709/245 |
| 7,941,748 B1* | 5/2011 | Sundermeyer | ............ | G06F 17/243 |
| | | | | 707/627 |
| 7,996,780 B1* | 8/2011 | Mitnick | ............ | G06F 8/38 |
| | | | | 715/760 |
| 8,250,525 B2* | 8/2012 | Khatutsky | ............ | G06F 11/3409 |
| | | | | 703/22 |
| 8,320,074 B2* | 11/2012 | Shiomi | ............ | G06K 7/084 |
| | | | | 360/110 |
| 8,473,901 B1* | 6/2013 | Johnson | ............ | G06F 9/44 |
| | | | | 717/106 |
| 8,548,992 B2* | 10/2013 | Abramoff | ............ | G06F 17/30994 |
| | | | | 707/726 |
| 8,560,956 B2* | 10/2013 | Curtis | ............ | G06F 17/21 |
| | | | | 715/205 |
| 8,676,919 B2* | 3/2014 | Bhat | ............ | G06F 9/4443 |
| | | | | 709/202 |
| 8,707,261 B2* | 4/2014 | Heller | ............ | G06F 8/30 |
| | | | | 717/120 |
| 8,819,617 B1* | 8/2014 | Koenig | ............ | G06F 8/70 |
| | | | | 717/101 |
| 8,972,872 B2* | 3/2015 | Labrou | ............ | G06F 8/00 |
| | | | | 715/744 |
| 9,009,651 B2* | 4/2015 | Kumar | ............ | G06Q 30/01 |
| | | | | 717/102 |
| 9,280,443 B2* | 3/2016 | Che | ............ | G06F 11/3612 |
| 9,628,468 B2* | 4/2017 | Manza | ............ | H04L 63/0838 |
| 9,703,534 B2* | 7/2017 | Ben-Tzur | ............ | G06F 8/34 |
| 2006/0005207 A1 | 1/2006 | Louch et al. | | |
| 2006/0015818 A1 | 1/2006 | Chaudhri et al. | | |
| 2006/0150118 A1 | 7/2006 | Chaudhri et al. | | |
| 2007/0162850 A1 | 7/2007 | Adler et al. | | |
| 2009/0144644 A1 | 6/2009 | Chaudhri et al. | | |
| 2011/0314085 A1 | 12/2011 | Koronthaly et al. | | |

OTHER PUBLICATIONS

Hudli et al, "An Evaluation Framework for Selection of Mobile App Development Platform", ACM, pp. 13-16, 2015.*
Heinrich et al, "Exploiting Annotations for the Rapid Development of Collaborative Web Applications", ACM, pp. 551-.*
Twomey et al, "Using Swarming to Build Complex Dashboards", ACM, pp. 1-7, 2017.*
Goldman et al, "RealTime Collaborative Coding in a Web IDE" ACM, pp. 1-10, 2011.*
Moreno et al, "Guiding accessibility issues in the design of Websites", ACM, pp. 65-72, 2008.*
Brown, "Topic Map Editing in a Java Web Portal", ACM, pp. 547-548, 2007.*
PCT International Search Report and Written Opinion for PCT/US2016/054241, dated Dec. 9, 2016, 18 Pages.

* cited by examiner

APPLICATION DASHBOARD FOR WEBSITE DEVELOPMENT AND MANAGEMENT

CROSS-REFERENCE TO RELATED APPLICATIONS

This application claims the benefit of U.S. Provisional Application No. 62/234,544, filed Sep. 29, 2015, which is incorporated by reference herein.

BACKGROUND

Technical Field

This disclosure relates to the field of user interfaces, and in particular to a user interface that includes an application dashboard for a website.

Description of Related Art

In many parts of the world, people have come to expect every organization, event, and public figure to have a website. As a result, many web editing applications have been developed to allow users who are unfamiliar with HTML, XML, JAVASCRIPT, CSS, or other web design tools to create and maintain professional and aesthetically pleasing websites. Websites may include applications to extend the functionality of the web pages of the website.

Applications provide content, perform tasks, and collect information to extend web page functionality. One critical drawback to applications is that managing associated content, tasks, and information for one or more applications on a website requires interfacing with multiple different user interfaces and visiting multiple websites. As a result, website users are less likely to use applications.

SUMMARY

The disclosed embodiments include a method, a non-transitory computer readable storage medium, and a system for providing an application dashboard for a website. A web editing server stores web pages created by users and hosts websites based on these pages. An app center stores apps that may be installed and executed on the websites formed by the web pages. The apps in the app center may be provided by the same entity that provides the web editing server or by separate (e.g., $3^{rd}$ part) app developers. The apps include code to extend the functionality of web pages in the websites.

The web editing server also includes an app dashboard module that provides a dashboard user interface (UI) to users' client devices, allowing users to view information provided by apps installed on the users' websites. In one embodiment, the app dashboard module presents the information as a series of cards, with each card providing information for an associated app. A user can select a card to obtain more information from the app. A user can also interact with components of cards such as buttons, links, and the like, to perform actions and send data to apps.

An app developer system allows an app developer to create and/or service an app in the app center. App developers may instruct the web editing server to create cards by selecting one or more components from a card definition module. A card definition module may automatically create cards based on app data received from the applications. In one embodiment, a card information module determines data attributes for the app data, including data type and data importance. A card definition module creates cards based on the data attributes. A card presentation module provides cards and card data to client devices. Data for multiple cards may be combined, compressed, or both to improve system efficiency. Data may be cached on client devices and made available for offline access.

One advantage of the dashboard UI is that users can view data from multiple apps in a single interface, whereas conventional approaches require users to use multiple applications. This allows users to avoid switching between multiple applications, which enhances the functionality and performance of users' client devices by using fewer device resources. Another advantage of this approach is that data for the dashboard UI is standardized for easier data flow between the servers and client devices compared to using multiple disparate systems for viewing and interacting with app information. For example, data corresponding to one or more cards may be combined, cached, compressed, or some combination thereof to reduce latency between client devices and servers compared to existing solutions. Each of the above advantages, in addition to improving system efficiency and computational performance, improves the user experience by allowing users to more quickly and efficiently manage websites.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the disclosure for purposes of illustration only. One skilled in the art will readily recognize from the following description that alternative embodiments of the structures and methods illustrated herein may be employed without departing from the principles described herein.

DETAILED DESCRIPTION

Figure 1:
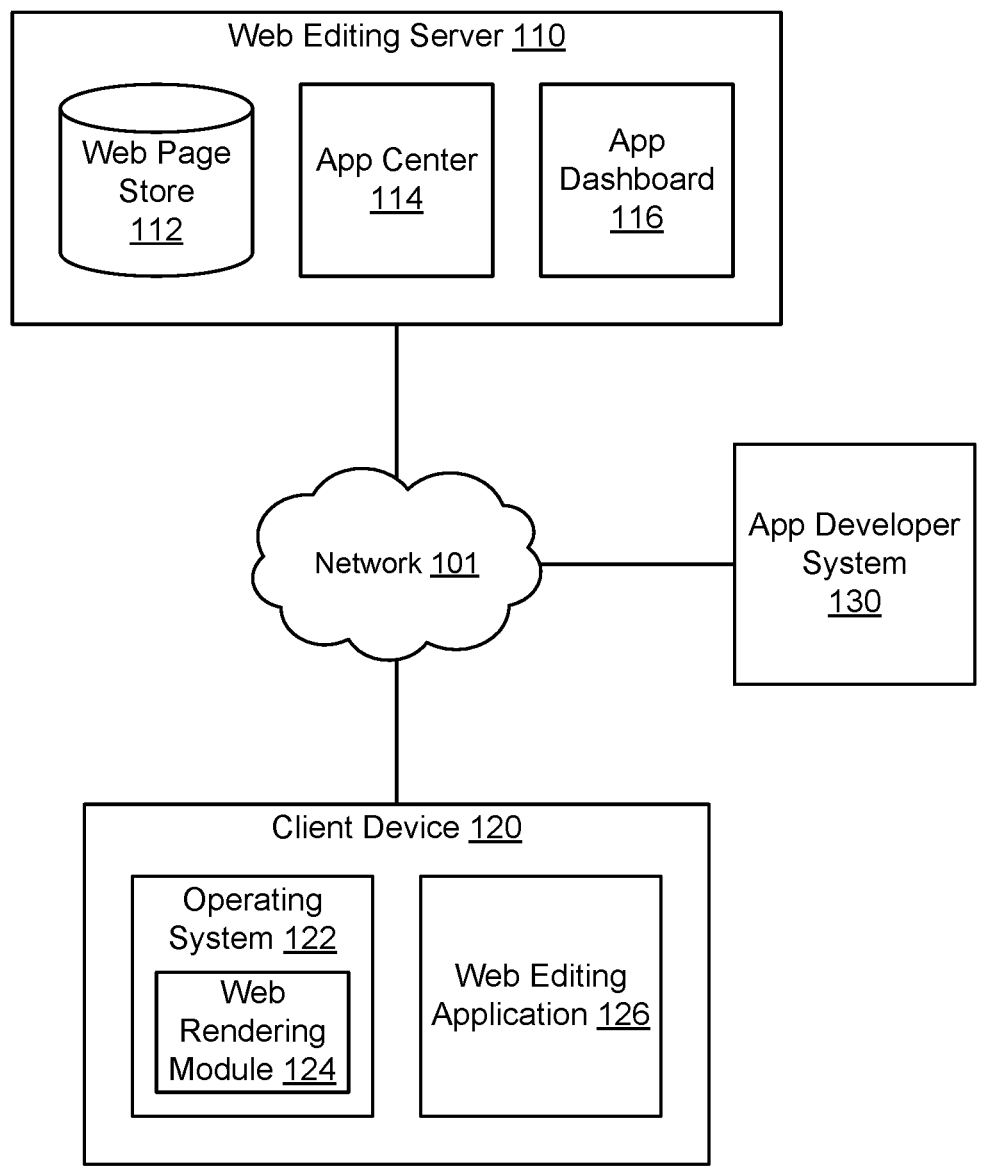
FIG. 1 is a block diagram of a computing environment for providing an application dashboard for a website according to one embodiment.

FIG. 1 is a block diagram of a computing environment 100 for providing an application dashboard for a website according to one embodiment. The computing environment 100 includes a web editing server 110, a client device 120, and one or more application ("app") developer systems 130 connected by a network 101. Although only one web editing server 110, client device 120, and app developer system 130 are illustrated, in practice there may be multiple instances of these entities. For example, there may be thousands or millions of client devices 120 as well as many app developer systems 130 in communication with several or many web editing servers 110.

The web editing server 110 stores web pages created by users and hosts websites based on these pages. As used herein, a web page is a data item that can be rendered to generate a page of content with one or more visual elements. Examples of visual elements include images, videos, headings, and body text. Some elements of a web page may contain other elements. For example, a column element may contain body text or image elements. Web pages can also include interactive visual elements that change appearance automatically or in response to a user interaction within the visual element.

In some embodiments, the web editing server 110 is implemented as a single server, while in other embodiments it is implemented as a distributed system of multiple servers. The web editing server 110 includes a web page store 112, an app center 114, and an app dashboard module 116. Some embodiments of the web editing server 110 have different modules than those described here. Similarly, the functions can be distributed among the modules in a different manner than is described here.

The web page store 112 includes a plurality of web pages created by users of the web editing server 110. Each web page in the web page store 112 includes instructions that define the size, position, and content of visual elements on the page. In one embodiment, the instructions are stored as structured data (e.g., JSON data) that can be used to assemble markup language (e.g., HTML) describing the page. The content of a visual element can either be included as part of the instructions for the corresponding web page or stored as separate data items that are referenced in the instructions for the web page. For example, body text and headings on the web page are included as part of the instructions, but images on the web page are stored as separate files and instructions include references to those files.

The web pages in the web page store 112 can be organized into websites. A website includes one or more individual web pages that are connected to each other (e.g., with hyperlinks). As mentioned above, the web editing server 110 may serve the web pages in the websites to visitors (i.e., people visiting the websites). Alternatively, the web serving functionality may be provided by a separate dedicated web server (not shown).

The app center 114 stores apps that may be installed and executed on the websites formed by the web pages in the web page store 112. The apps in the app center 114 may be provided by the same entity that provides the web editing server 110 or by separate (e.g., $3^{rd}$ party) app developers that are independent from the web editing server 110. The apps include code that is executed by the web editing server 110 (or other server serving the websites) to extend the functionality of web pages in the websites. For example, the apps may provide specific types of content, perform specific tasks, or collect specific types of information when visitors access the web pages of the websites. When the apps execute, the apps may access services or other resources provided by the $3^{rd}$ party app developers via servers maintained by the $3^{rd}$ parties.

The web editing server 110 also includes an app dashboard module 116 that provides a dashboard user interface (UI) allowing users to view information provided by apps from the app center that are installed and executed on the users' websites. In one embodiment, the app dashboard module 116 presents the information as a series of cards, with each card providing information for an associated app. Cards corresponding to a particular application may vary across different users of the dashboard UI, and in various embodiments, cards are customized based on information about a user. A user can select a card to obtain more information from the app. Unlike conventional approaches, presenting information provided by the apps in the dashboard UI allows users to view and interact with information from multiple apps (including third party apps) together without having to use multiple applications on the client device.

One advantage of the dashboard UI is that users can view data from multiple apps in a single interface, whereas conventional approaches require users to use multiple applications. This allows users to avoid switching between multiple applications, which enhances the functionality and performance of users' client devices by using fewer device resources. Another advantage of this approach is that data for the dashboard UI is standardized for easier data flow between the servers and client devices compared to using multiple disparate systems for viewing and interacting with app information. For example, data corresponding to one or more cards may be combined, cached, compressed, or some combination thereof to reduce latency between client devices and servers compared to existing solutions. Further, managing the dashboard UI data with one system allows data from different apps to be used and analyzed together to determine trends, spot issues, and trigger actions within the system. Each of the above advantages, in addition to improving system efficiency and computational performance, improves the user experience by allowing users to more quickly and efficiently manage websites. The app dashboard module 116 is described further below.

The client device 120 is a computing device that allows a user to interact with the web editing server 110 to create and edit web pages. For example, the client device 120 may be a mobile device such as a tablet computer or a smart phone. The client device 120 may alternatively be a laptop or desktop computer. As shown in FIG. 1, the client device 120 executes an operating system 122 and a web editing application 126.

Figure 7:
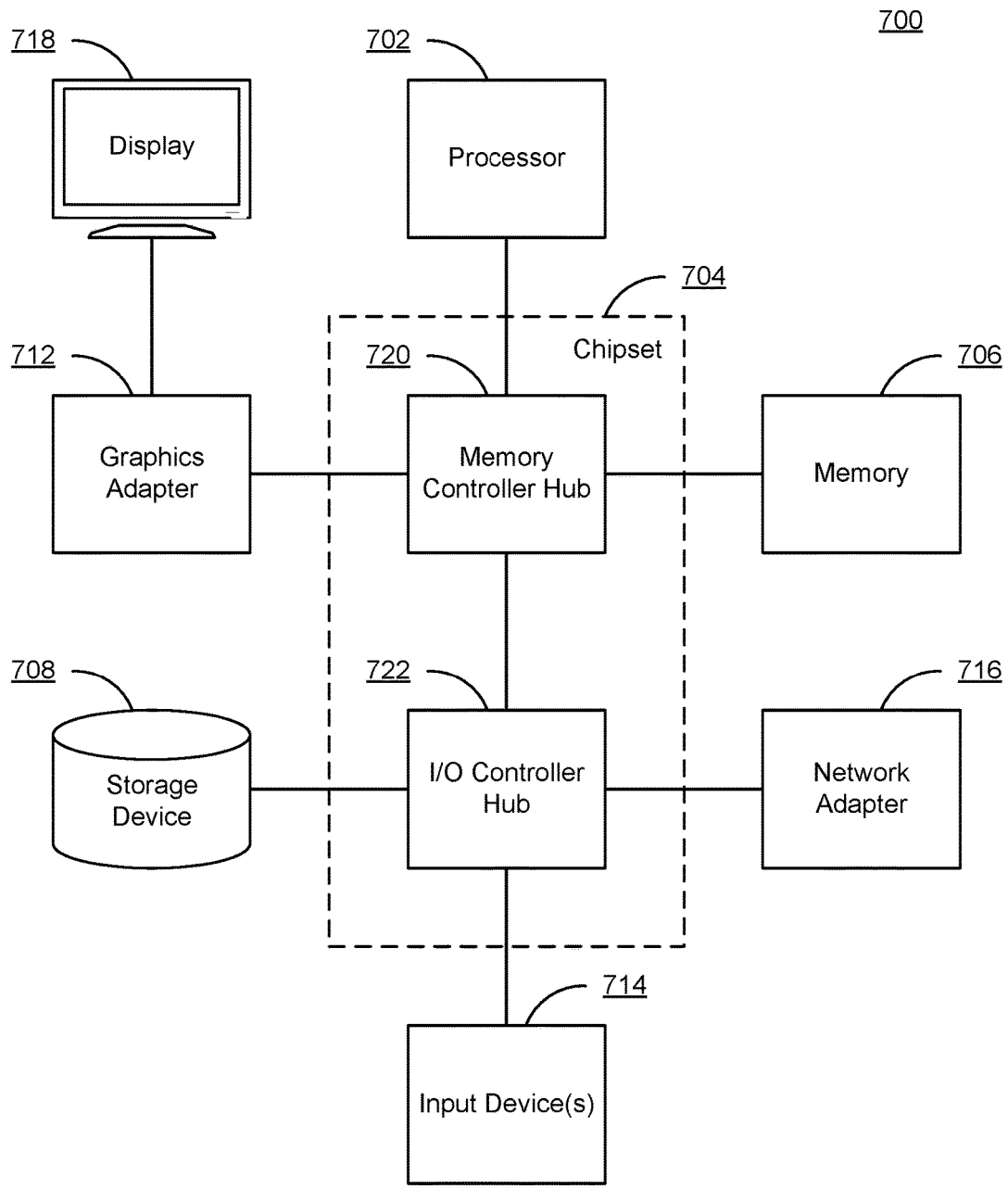
FIG. 7 is a high-level block diagram of the components of a computing system for use, for example, as the web editing server, the client device, or the app developer system shown in FIG. 1, in accordance with an embodiment.

The operating system 122 provides modules that allow applications on the client device 120 (e.g., the web editing application 126) to interact with hardware components of the client device 120, such as the hardware components described in FIG. 7. One of these modules is the web rendering module 124, which receives instructions for rendering a web page and executes the instructions to render a visual representation of the web page. As described above with reference to the web editing server 110, a rendered web page includes one or more visual elements, such as images, videos, body text, and headings.

The web editing application 126 retrieves web pages and operates in conjunction with the web rendering module 124 to provide an interface that allows a user to edit the web pages. After the user makes one or more edits to a web page, the web editing application 126 also sends edited web pages back to the web editing server 110 to be stored in the web page store 112. As part of the editing process, the user may select one or more apps from the app center 114 and install the apps on the web page.

The app developer system 130 represents a computer system used by an app developer to create and/or service an app in the app center 114. For example, an app developer can use the app developer system 130 to create an app and then provide the app to the web editing server 110 for placement in the app center 114. In addition, the app developer system 130 can interact with an instance of the app that is executing on a website provided by the web editing server 110. The app developer system 130 may support the functionality of the app and provide the information that is presented by the app in the dashboard UI, or "app data."

The network 101 provides a communication infrastructure between the web editing server 110, client device 120, and app developer system 130. The network 101 is typically the Internet, but may be any networking, including but not limited to a Local Area Network (LAN), a Metropolitan Area Network (MAN), a Wide Area Network (WAN), a mobile wired or wireless network, a private network, or a virtual private network.

Figure 2:
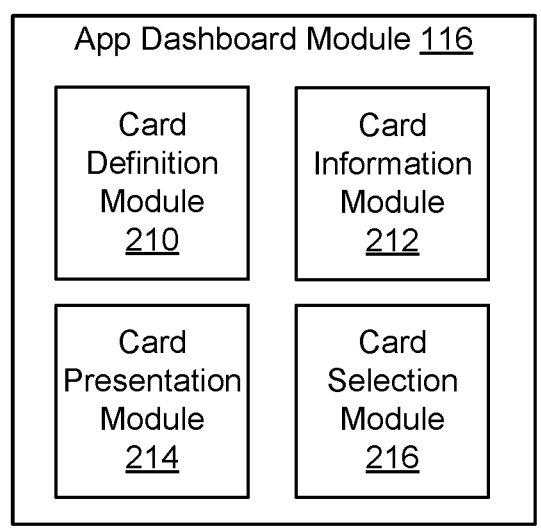
FIG. 2 is a high-level block diagram illustrating a detailed view of the app dashboard module within a web editing server according to an embodiment.

FIG. 2 is a high-level block diagram illustrating a detailed view of the app dashboard module 116 within the web editing server 110 according to an embodiment. Other embodiments may include other and/or different modules. Likewise, the functions described herein may be distributed among the modules in different ways. The app dashboard module 116 includes a card definition module 210, a card information module 212, a card presentation module 214, and a card selection module 216.

The card information module 212 provides an interface by which an app can provide app data for use in an associated card. In one embodiment, the card information module 212 provides one or more application programming interfaces (APIs) for providing app data to the web editing server 110 for creating and updating cards in the dashboard UI. Each component may have an associated API that describes how an app can provide information for use with the component. Thus, an API for a data display component describes how an app can interface with the data display component to display data in a card. Likewise, an API for an action component describes how an app can interface with the action component to define the action performed when the component is activated.

In one embodiment, the card information module 212 includes, or interacts with, an authentication server (e.g., an OAuth server) that controls access to the APIs. The authentication server authenticates apps and/or app developer systems 130, or other entities that attempt to provide information to cards via the APIs. The entities that are authenticated are allowed to provide information via the APIs.

In one embodiment, the card information module 212 manages the methods and frequency for receiving app data. In various embodiments the card information module 212 determines the refresh method for app data, e.g., whether app data is pulled by the card information module 212 from the entity providing the data, pushed by the entity to the card information module, or some combination thereof. Recall that dashboard UI cards for a given application may be different across different users. The refresh method may be determined based on user information (e.g., frequency of visits to the dashboard UI, frequency of use of application), based on the app data itself (e.g., frequency of changes to app data), or some combination thereof.

An embodiment of the card information module 212 provides an API that allows the entity providing the card information (e.g., a server of an app) or an app developer to specify the refresh method for the card, e.g., whether data is pulled from the entity or pushed by the entity to the card. The API allows the entity or developer to specify how often the data should be refreshed in the pull method. For push configurations, the API allows the entity or developer to register a webhook that is called when an event occurs that causes the card information to be updated.

The API further supports structured elements including a Metric element that is a single number, a Trend Line element that is an array of numbers, and a Tabular Data element that includes 2-dimensional data with the first row containing column names. The structured elements can link to an external URL, an application deep link, or to a takeover screen. The takeover screen displays contents from an app developer system 130 and is discussed below in connection with card selection module 216.

The card information module 212 analyzes app data to determine data attributes for use by the card definition module 210 in assembling or updating cards. Data attributes characterize data and can help the card definition module 210 determine which app data to include in cards ("card data") and how to display the card data. Data attributes include data type and data importance. Examples of data types include sales data, reservation data, customer information, page views, user profile information, and business information. The card information module 212 may determine data type by analyzing the format of data, patterns in the data, or other data characteristics. For example, the card information module 212 may analyze a list of text strings and determine based on data formatting and patterns that the list is a list of email addresses. In another embodiment, data is labeled as a certain data type by the developer.

Data importance is a measure of the salience of particular data within a set of app data, and may be used by the card definition module 210 to determine which data to include in a card. The card information module 212 determines data importance by analyzing data characteristics including data age, changes to data, deviations from expectations in data, or some combination thereof. The card information module 212 may determine expectations for data based on past data to generate predictions about future data. For example, the card information module 212 may determine that a user's store receives 10 orders per day on average, and if the store receives 100 orders in a single day, the card information module 212 may assign a high importance measure to the order data for that day, because that information is likely to be salient to the user and should be included in a card. The card information module 212 may additionally determine data importance for a particular user by analyzing user information or behavior. For example, if a user logs in each day to check reservations to their restaurant, the card information module 212 may assign a low importance value to reservations made two days ago because the user is likely to have seen that information already.

The card definition module 210 provides a set of components that can be used to form a card for display in a dashboard UI. A component is a user interface element that displays data, accepts user input, performs actions, or some combination thereof. In one embodiment, there are multiple components, and each component provides a particular display of data, accepts a particular user input, performs a particular action, or some combination thereof. A component may be a data display component, an event component, a progress indicator component, an action component, some other user interface element, or some combination thereof. The data display components include components for displaying data using one or more of a variety of techniques. The techniques may include displaying data as a numeric or textual value, as a graph or graph component (e.g., a sparkline), as tabular data, or as a combination of multiple display components. Event components include components for displaying data related to events. Event components may include event attributes such as date, time, title, attendees, location, and the like. Progress indicator components may visually display percent completion of various tasks. The action components include components for performing a variety of actions with respect to data or content associated with a website. For example, the action components may perform actions including posting blog comments, displaying application usage tips, and creating web input forms. Components may have associated component formatting, such as color, shading, text size, non-textual item size, and the like.

In some embodiments, an app developer interacts with the card definition module 210 (e.g., via the app developer system 130) to select one or more components from the card definition module 210. The app developer defines a card for the developer's app using the selected components. In addition, the app developer may define component formatting and the layout of any graphical aspects of the selected components in the card. For example, the app developer may define a card that includes a textual display, a numeric display beneath the textual display, and a sparkline adjacent to the numeric display.

In another embodiment, the card definition module 210 automatically creates and/or updates a card based on data attributes received from the card information module 212. The card definition module 210 may analyze the data attributes and select appropriate components and component formatting to include in the card. For example, if the app allows web site visitors to reserve tables at restaurants, the card definition module 210 may recognize the data type of the reservation data received from the app and select a calendar component to display booked reservations in the card. In one embodiment, the card definition module 210 determines which app data to include as card data based on the determined data importance. Data with a higher measure of data importance is selected over data with lower importance.

The card definition module 210 determines appropriate components (including component formatting) for displaying card data. The card definition module 210 maintains associations between data attributes and components. An association is a link between a data attribute and a component that indicates that the component can be used to display data, accept user inputs, or perform actions related to the data attribute. In various embodiments, a data attribute may be associated with multiple components, and a component may be associated with multiple data attributes. Associations may be provided to the card definition module 210 or the card definition module 210 may determine the associations automatically. In one embodiment, the associations are determined using a machine learning model that analyzes the behavior of app developers or the card definition module 210 defining cards in the past. The model may determine which components are selected for certain types of data and create generalizations for creating the associations. The card definition module 210 detects a certain type of data and uses the maintained associations to select appropriate components for inclusion in a card. In various embodiments, the app developer may customize automatically created cards by modifying, adding, or removing components.

In some embodiments, a card defined using the card definition module 210 is stored in the associated app as a set of references to the utilized card components in the card definition module 210. In other embodiments, the card definition module 210 stores a defined card, and the app includes a reference to the stored card. Other embodiments may represent and store a defined card using other techniques.

The card presentation module 214 provides cards and card data associated with apps to client devices 120 for presentation to users. Recall that the users have interacted with the web editing server 110 to define web pages for websites and that the web pages may include one or more embedded apps from the app center 114. For a given user, an embodiment of the card presentation module 214 provides a dashboard UI displaying the cards associated with the apps on that user's website for display to the user. The displayed cards may include any default cards defined by the operator of the web editing server 110 as well as cards defined in association with the apps on the user's website. Each card displays information about the associated app and may also permit the user to perform an action, depending upon the components included in the card.

In one embodiment, the card data is provided to client devices 120 using the API provided by the card information module 212. In another embodiment, the card data is provided to the client devices 120 by the card presentation module 214. The card presentation module 214 may combine data for multiple cards and send the combined data to a client device 120. This is a unique advantage of the dashboard UI, because the data can be handled and standardized by the web editing server 110 prior to sending it to the client device 120 rather than being sent directly from multiple data sources. In one embodiment, the card presentation module 214 compresses data prior to sending the data to the client device 120. This improves the speed and function of the web server 110 and the client devices 120 by reducing the amount of data transmitted. In one embodiment, the card presentation module 214 provides the data such that it may be cached on the client device 120. This improves system function, because data can be transmitted even with inconsistent network connectivity. Further, once the card data is cached on the client device 120, it may be accessed offline.

In some embodiments, the cards are arranged in a grid layout. The card presentation module 214 may arrange the cards in horizontal and vertical rows for display on the client device 120. For example, the grid may display a row of two cards arranged horizontally and two columns of multiple cards arranged vertically on the display of the client device 120. The user can scroll vertically to view all of the cards in the columns. If a user adds a new app having an associated card to the user's website, the new card is added either to the last row or a new row at the bottom of the grid. In some embodiments, the user can modify and customize the dashboard UI by moving cards to new locations or deleting cards from the dashboard. The web editing server 110 stores the user's customized UI in association with the user. The card selection module 216 receives a selection of a card presented on the dashboard UI and presents additional information associated with the card. In one embodiment, the card selection module 216 is notified when a user selects a particular card. For example, the client device 120 may detect when a user taps on a card using a touch-screen interface, clicks on a card using a mouse or other pointing device, or orally references a card using a voice interface. In response to the user selecting the card, the client device notifies the card selection module 216 that the card has been selected. The card selection module 216 modifies the dashboard UI by expanding the selected card so that it occupies additional space and overlays any other cards displayed in the dashboard UI. The expanded card displays additional information associated with the card's app. The app developer system 130 sends this additional information via the API provided by the card information module 212. The modified dashboard UI is provided to the client device 120 for presentation to the user.

In one embodiment, the card selection module 216 expands the selected card by creating an HTML inline frame ("iframe"). The card selection module 216 notifies the app developer system 130 associated with the selected app of the card selection. The app developer system 130, in turn, populates the iframe with content from the app developer system. In this way, the app developer system 130 controls and determines the content that is displayed within the iframe. Thus, the app developer can provide any desired information in the iframe.

Figure 3:
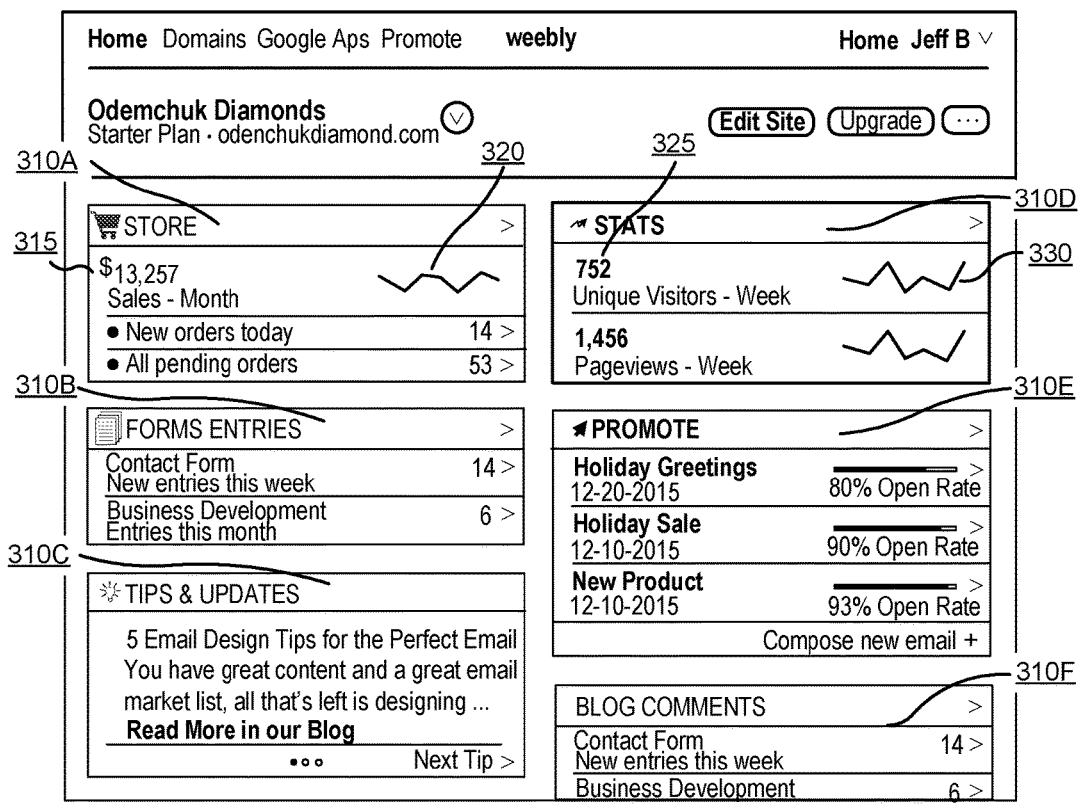
FIG. 3 illustrates an example of a dashboard UI generated by a card presentation module shown in FIG. 2 according to one embodiment.

FIG. 3 illustrates an example of a dashboard UI 301 generated by the card presentation module 214 according to one embodiment. The illustrated dashboard UI 301 is associated with a website entitled "O Diamonds" and includes cards 310A-F titled "Store," "Stats," "Forms Entries," "Promote," "Tips & Updates," and "Blog Comments", respectively. Each card 310 includes displays information from an associated app. In some embodiments, the components of the cards 310 correspond to data attributes for app data for the associated app. For example, The "Store" card 310A is related to a "Store" app. App data from the "Store" app may include sales data, order information, order status, customer information, and the like. The card 310A displays data from the "Store" app received via the API, and allows a user to view and interact with this data. For example, the card 310A includes a numeric value 315 (Sales-Month) corresponding to monthly sales and an associated graphic 320 to the right of the numeric value (a sparkline in this example). The card 310A also includes buttons 317A-B to access order information. In one embodiment, the buttons 317 are links to a third party website, for example created by the developer of the "Store" app or a link to a location within the app itself. In a conventional setting without a dashboard UI, the user would have to open a third party application to view and interact with the information associated with the "Store" app on the website. This results in increased usage of system resources on the user's client device 120 and a less desirable user experience compared to the embodiments described herein.

The "Stats" card is related to an application that tracks website statistics. App data from the "Stats" app may include page views, visitor data, search terms used to find a site, and the like. The "Stats" card 310D includes data received from the "Stats" app, for example via the API. For example, the card 310D includes a numeric value 325 (e.g., 752 "Unique Visitors-Week") and an associated graphic 330 to the right of the numeric value (a sparkline in this example).

Because the data that is provided by various apps for the cards 310 may be updated frequently, the cards are capable of changing frequently to reflect the most up-to-date data. In various embodiments, when new or updated data is received, for example at the API, the cards are updated to reflect the data.

Figure 4:
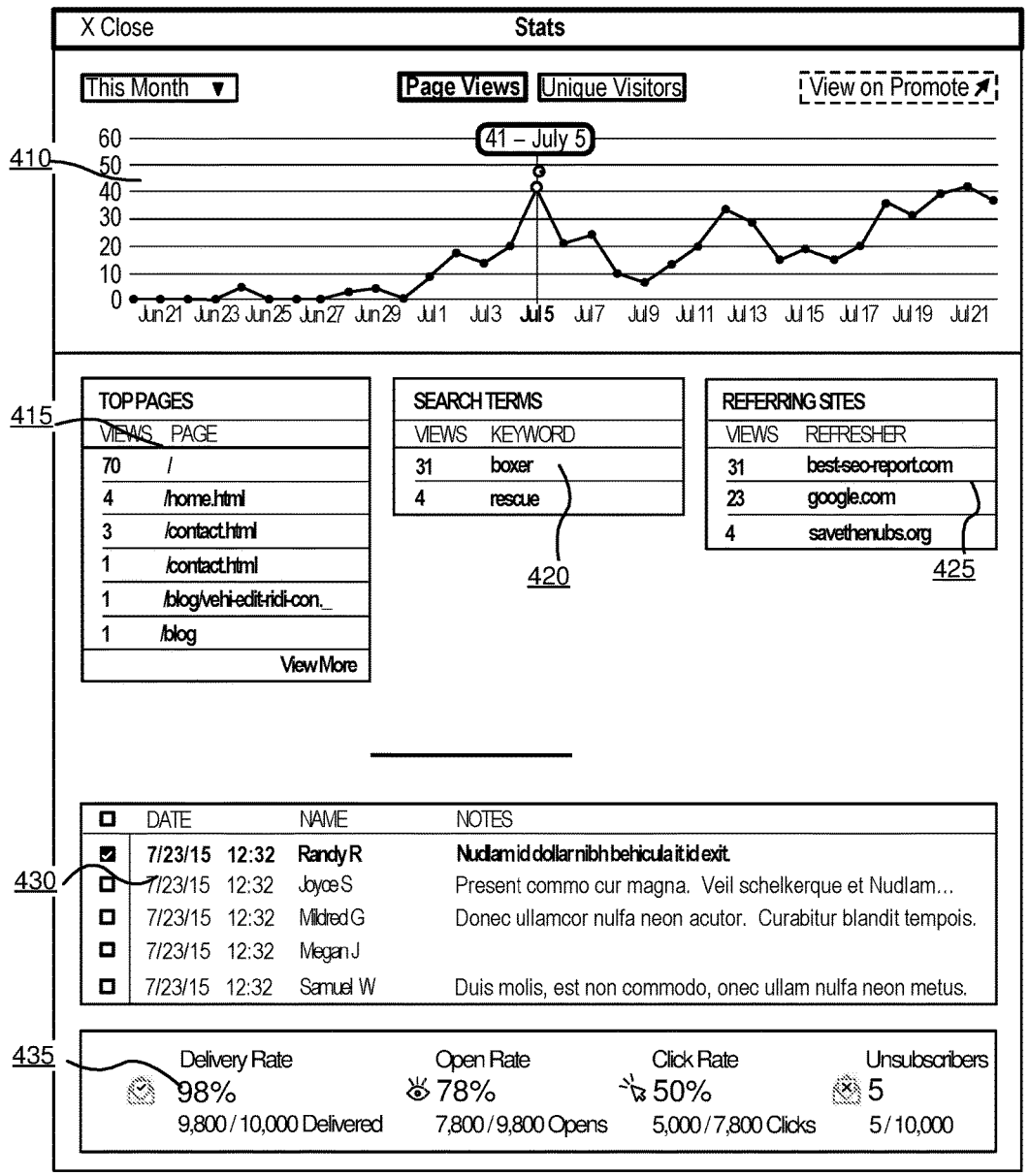
FIG. 4 illustrates an example of a dashboard UI generated by the card selection module shown in FIG. 2 after a card is selected according to one embodiment.

FIG. 4 illustrates an example of a dashboard UI 401 generated by the card selection module 216 after a card is selected according to one embodiment. The example shows the dashboard UI 401 after the "Stats" card 310D is selected by a user. The card is expanded into an iframe that occupies the entire display, and shows additional statistics about the O Diamonds website beyond those statistics presented by the corresponding card in the grid view 301. The dashboard UI 401 also includes user interface elements for interacting with the data. Like the card 310D of FIG. 3, the dashboard UI 401 displays data received from the "Stats" app, for example via the API. In this example, the iframe contains a graph 410 illustrating the number of page views of the website by day, and contains a window 415 describing the top pages (i.e., the most visited pages), a window 420 describing the search terms used to reach the website, and a window 425 describing the referring sites that referred visitors to the website. The iframe further contains a window 430 displaying messages received at the website and a window 435 displaying statistics related to advertising messages.

Figure 5:
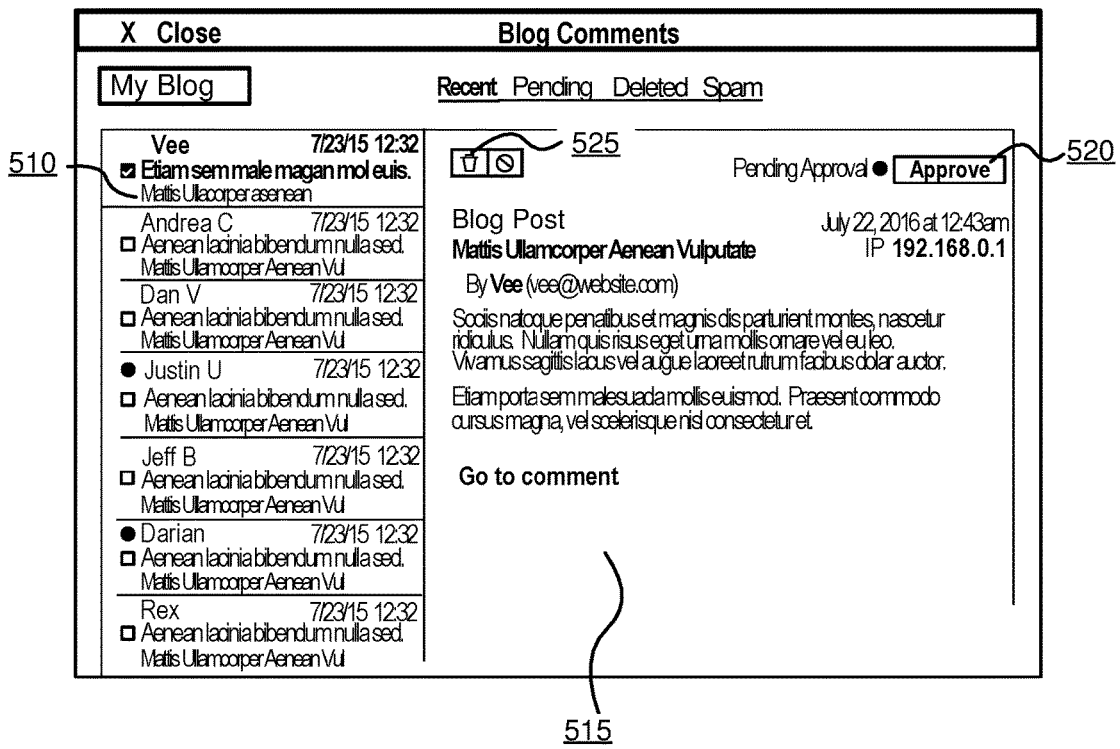
FIG. 5 illustrates a second example of a dashboard UI generated by the card selection module shown in FIG. 2 after a card is selected according to one embodiment.

FIG. 5 illustrates a second example of a dashboard UI 501 generated by the card selection module 216 after a card is selected according to one embodiment. The example of FIG. 5 shows the dashboard 501 after the "Blog Comments" card 310F is selected. The "Blog Comments" card 310F may be associated with a "Blog" app, which allows users to create and manage weblogs. The expanded card displays a section 510 containing a list of blog comments, a section 515 with an expanded view of a selected blog comment and buttons with which a user can perform actions, such as approving (approve button 520) or deleting the blog comment (delete button 525). The data in sections 510 and 515 is received from the "Blog" app, for example via the API. The action buttons 520 and 525 communicate with the "Blog" app to edit data in the app without the user having to leave the dashboard.

Figure 6:
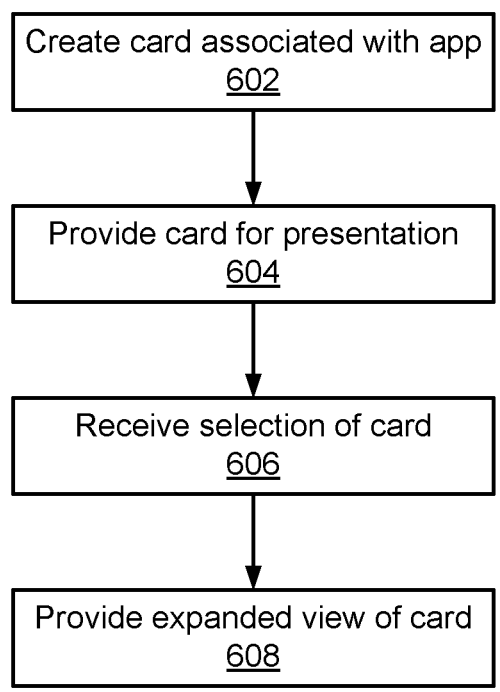
FIG. 6 is a flowchart illustrating a method of presenting an app dashboard according to one embodiment.

FIG. 6 is a flowchart illustrating a method of presenting an app dashboard according to one embodiment. In one embodiment, the process of FIG. 6 is performed by the web editing server 110. Other embodiments may include different and/or additional steps. Likewise, the steps may be performed in different orders.

The web editing server 110 creates 602 a card associated with an app. In one embodiment, a developer of the app interacts with the web editing server 110 to provide criteria for the web editing server 110 to create the card associated with the app. The web editing server 110 may receive a request from the developer to create a card. The request may include criteria for creating the card such as specified components, layout properties, other criteria, or some combination thereof. In another embodiment, the web editing server 110 automatically creates a card associated with the developer's app. The web editing server 110 may receive a request, for example from the app developer system 130, to create a card. The request may include app data for automatically creating a card.

Subsequently, a user of the web editing server 110 installs that developer's app on the user's website. In one embodiment, responsive to the installation, the web editing server 110 alters instructions for presenting the dashboard UI for the user to include the card for the installed app.

The web editing server 110 provides 604 the card for the app for presentation in the dashboard UI on a client device 120. In one embodiment, when the user accesses, via the client device 120, the dashboard UI provided by the web editing server 110, the server provides a dashboard showing the card for the app for presentation on the client device 120.

The user may select the card displayed in the dashboard UI by interacting with the client device 120. The web editing server 110 receives 606 the selection of the card. In response, the web editing server provides 608 an expanded view of the selected card for presentation on the client device 120. In one embodiment, the expanded view is contained within an iframe, and the app developer provides information that is displayed within the iframe from the developer's system 130.

FIG. 7 is a high-level block diagram of the components of a computing system 700 for use, for example, as the web editing server 110, the client device 120, or the app developer system 130 shown in FIG. 1, according to one embodiment. The computing system 700 includes at least one processor 702 coupled to a chipset 704. Also coupled to the chipset 704 are a memory 706, a storage device 708, a graphics adapter 712, input device(s) 714, and a network adapter 716. A display 718 is coupled to the graphics adapter 712. In one embodiment, the functionality of the chipset 704 is provided by a memory controller hub 720 and an input/output (I/O) controller hub 722. In another embodiment, the memory 706 is coupled directly to the processor 702 instead of the chipset 704.

The processor 702 is an electronic device capable of executing computer-readable instructions held in the memory 706. In addition to holding computer-readable instructions, the memory 706 also holds data accessed by the processor 702. The storage device 708 is a non-transitory computer-readable storage medium that also holds computer readable instructions and data. For example, the storage device 708 may be embodied as a solid-state memory device, a hard drive, compact disk read-only memory (CD-ROM), a digital versatile disc (DVD), or a BLU-RAY disc (BD). The input device(s) 714 may include a pointing device (e.g., a mouse or track ball), a keyboard, a touch-sensitive surface, a camera, a microphone, sensors (e.g., accelerometers), or any other devices typically used to input data into the computer 700. The graphics adapter 712 displays images and other information on the display 718. In some embodiments, the display 718 and an input device 714 are integrated into a single component (e.g., a touchscreen that includes a display and a touch-sensitive surface). The network adapter 716 couples the computing device 700 to a network, such as the network 101.

As is known in the art, a computer 700 can have additional, different, and/or other components than those shown in FIG. 7. In addition, the computer 700 can lack certain illustrated components. In one embodiment, a computer 700 acting as a server may lack input device(s) 714, a graphics adapter 712, and/or a display 718. Moreover, the storage device 708 can be local and/or remote from the computer 700. For example, the storage device 708 can be embodied within a storage area network (SAN) or as a cloud storage service.

As is also known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, computer program modules are stored on the storage device 708, loaded into the memory 706, and executed by the processor 702.

As used herein, a computer program product comprises one or more computer program modules that operate in conjunction to provide the functionality described herein. Thus, a computer program product may be stored on the storage device 708, loaded into the memory 706, and executed by the processor 702 to provide the functionality described herein.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A computer program product comprising instructions for providing an application dashboard on a client device having a processor, the instructions when executed causing the processor to:

create, by a web editing server, a card that includes one or more components providing data associated with an application installed on a website hosted by the web editing server, the application comprising code executed by the web editing server to extend functionality of web pages in the website, the card having an associated expanded view providing additional data associated with the functionality of the application, wherein creating the card comprises:

analyzing received application data to identify one or more data types, determining a data importance of a subset of the application data, and selecting a component for the card based on the one or more data types and the data importance;

provide, to a client device, the card for presentation in a dashboard user interface for managing the website;

provide, to the client device, an update to the one or more components included in the card, the updating comprising sending updated data to the client device for inclusion in the card;

receive, from the client device, a selection of the card by a user of the dashboard user interface; and provide, to the client device, the expanded view of the card for presentation in the dashboard user interface.

2. The computer program product of claim 1, wherein the card is created responsive to receiving a request from an app developer.

3. The computer program product of claim 1, wherein the updated data is provided by the web editing server such that it may be cached on the client device for offline access.

4. The computer program product of claim 1, wherein the selection is performed based on associations between data types and components maintained by the web editing server.

5. The computer program product of claim 1, wherein the one or more components comprise at least one of text or a graph.

6. A method for providing an application dashboard, the method comprising:

creating, by a web editing server, a card that includes one or more components providing data associated with an application installed on a website hosted by the web editing server, the application comprising code executed by the web editing server to extend functionality of web pages in the website, the card having an associated expanded view providing additional data associated with the functionality of the application, wherein creating the card comprises:

analyzing received application data to identify one or more data types, determining a data importance of a subset of the application data, and selecting a component for the card based on the one or more data types and the data importance;

providing, to a client device, the card for presentation in a dashboard user interface for managing the website;

providing, to the client device, an update to the one or more components included in the card, the updating comprising sending updated data to the client device for inclusion in the card;

receiving, from the client device, a selection of the card by a user of the dashboard user interface; and providing, to the client device, the expanded view of the card for presentation in the dashboard user interface.

7. The method of claim 6, wherein the card is created responsive to receiving a request from an app developer.

8. The method of claim 6, wherein the updated data is provided by the web editing server such that it may be cached on the client device for offline access.

9. The method of claim 6, wherein the selection is performed based on associations between data types and components maintained by the web editing server.

10. The method of claim 6, wherein the one or more components comprise at least one of text or a graph.

11. A system for providing an application dashboard, the system comprising:

a computer processor; and a computer-readable storage medium storing processor-executable computer program instructions, the computer program instructions comprising instructions for:

creating, by a web editing server, a card that includes one or more components providing data associated with an application installed on a website hosted by the web editing server, the application comprising code executed by the web editing server to extend functionality of web pages in the website, the card having an associated expanded view providing additional data associated with the functionality of the application, wherein creating the card comprises:

analyzing received application data to identify one or more data types, determining a data importance of a subset of the application data, and selecting a component for the card based on the one or more data types and the data importance;

providing, to a client device, the card for presentation in a dashboard user interface for managing the website;

providing, to the client device, an update to the one or more components included in the card, the updating comprising sending updated data to the client device for inclusion in the card;

receiving, from the client device, a selection of the card by a user of the dashboard user interface; and providing, to the client device, the expanded view of the card for presentation in the dashboard user interface.

12. The system of claim 11, wherein the card is created responsive to receiving a request from an app developer.

13. The system of claim 11, wherein the updated data is provided by the web editing server such that it may be cached on the client device for offline access.

14. The system of claim 11, wherein the selection is performed based on associations between data types and components maintained by the web editing server.

* * * * *